United States Patent
Jia et al.

(10) Patent No.: US 10,975,198 B2
(45) Date of Patent: Apr. 13, 2021

(54) TERPOLYMERIZATION OF CARBON MONOXIDE, AN OLEFIN, AND AN EPOXIDE

(71) Applicants: Li Jia, Hudson, OH (US); Xiaofei Jia, Akron, OH (US)

(72) Inventors: Li Jia, Hudson, OH (US); Xiaofei Jia, Akron, OH (US)

(73) Assignee: The University of Akron, Akron, OH (US)

( * ) Notice: Subject to any disclaimer, the term of this patent is extended or adjusted under 35 U.S.C. 154(b) by 32 days.

(21) Appl. No.: 15/781,541

(22) PCT Filed: Dec. 6, 2016

(86) PCT No.: PCT/US2016/065099
§ 371 (c)(1),
(2) Date: Jun. 5, 2018

(87) PCT Pub. No.: WO2017/100172
PCT Pub. Date: Jun. 15, 2017

(65) Prior Publication Data
US 2018/0346645 A1    Dec. 6, 2018

Related U.S. Application Data

(60) Provisional application No. 62/265,736, filed on Dec. 10, 2015.

(51) Int. Cl.
*C08G 67/02* (2006.01)
*C08G 65/26* (2006.01)
(Continued)

(52) U.S. Cl.
CPC .......... *C08G 67/02* (2013.01); *B01J 31/2404* (2013.01); *B01J 31/28* (2013.01); *C08G 65/26* (2013.01);
(Continued)

(58) Field of Classification Search
CPC ...................................................... C08G 67/02
(Continued)

(56) References Cited

U.S. PATENT DOCUMENTS 3,948,832 A     4/1976  Hudgin
2011/0319849 A1 12/2011 Collias

OTHER PUBLICATIONS

Liu, et al.; "Design of carbonylative polymerization of heterocycles. Synthesis of polyesters and poly(amide-block-ester)s" J. Am. Chem. Soc. 2004, vol. 126, pp. 14716-14717; 6 pages.
(Continued)

*Primary Examiner* — Shane Fang
(74) *Attorney, Agent, or Firm* — Renner, Kenner, Greive, Bobak, Taylor & Weber

(57) ABSTRACT

In various embodiments, the present invention is directed to terpolymers of carbon monoxide (CO), olefins (alkenes), and epoxides, as well as related methods and catalysts for their making and use. These terpolymer chains are comprised of ketone repeat units, ester repeat units, and ether repeat units. The additional presence of the ester repeat units and ether repeat units have the effect of lowering terpolymer melt temperature relative to that of similar polyketone, thus separating melt temperature from decomposition temperature, making it suitable for melt processing. In a single reaction mixture, the same metal catalyst that polymerizes CO with olefins also incorporates epoxide monomers into the terpolymer in the form of ester or ester and ether linkages. As a part of the terpolymer chain, the ester groups can undergo hydrolysis, rendering these terpolymer compositions hydrolytically degradable.

11 Claims, 4 Drawing Sheets

(51) Int. Cl.
*B01J 31/24* (2006.01)
*B01J 31/28* (2006.01)
*C08L 23/08* (2006.01)

(52) U.S. Cl.
CPC ...... *C08G 65/2603* (2013.01); *C08L 23/0884* (2013.01); *B01J 2531/847* (2013.01); *C08G 2650/40* (2013.01); *C08L 2205/03* (2013.01)

(58) Field of Classification Search
USPC .................................................... 528/393
See application file for complete search history.

(56) References Cited

OTHER PUBLICATIONS

Jia, et al.; Zwitterionic Nickel(II) Cayalyst for CO-Ethylene Alternating Copolymerization Organometallics, Sep. 30, 2015, vol. 34 (20) pp. 4798-4801; 13 pages.

TERPOLYMERIZATION OF CARBON MONOXIDE, AN OLEFIN, AND AN EPOXIDE

CROSS REFERENCE TO RELATED APPLICATIONS

This application claims the benefit of International Application No. PCT/US2016/065099, entitled "Terpolymerization of Carbon Monoxide, an Olefin, and an Epoxide", filed Dec. 6, 2016, which claims the benefit of U.S. provisional patent application Ser. No. 62/265,736 entitled "Terpolymerization of Carbon Monoxide, an Olefin, and an Epoxide," filed Dec. 10, 2015, both of which are incorporated herein by reference in their entirety.

STATEMENT REGARDING FEDERALLY SPONSORED RESEARCH OR DEVELOPMENT SUPPORT

This invention was made with government support under Contract No. CHE-01266422 awarded by the U.S. National Science Foundation (NSF). The government has certain rights in the invention.

FIELD OF THE INVENTION

One or more embodiments of the present invention relates to terpolymerization of carbon monoxide. In certain embodiments, the present invention relates to terpolymers of carbon monoxide (CO), olefins, and epoxides and related methods for making and use.

BACKGROUND OF THE INVENTION

The preparation of polyketones via the polymerization of carbon monoxide (CO) with olefins has been the subject of considerable interest. (See e.g., "Olefin-carbon monoxide copolymers", Sommazzi, A.; Garbassi, F. *Prog. Polym. Sci.* 1997, 22, 1547-1605, the disclosure of which is incorporated herein by reference in its entirety). The raw materials are readily available whereas the product, polyketone, is useful for a variety of thermoplastic applications. The polymer exhibits several desirable mechanical properties including high strength, rigidity, and impact resistance. Additionally, it is known that carbonyl chromophores located in the backbone make the polymer capable of photodegradation.

The catalyst for CO-olefin copolymerization is often a cationic Pd compound of the structure $(L2)Pd(L')^+$, where L2 is a bidentate phosphine ligand, L' is a labile ligand such as solvent, CO, or olefin (See, "Palladium-catalyzed alternating copolymerization of alkenes and carbon monoxide," Drent, E.; Budzelaar, P. *Chem. Rev.* 1996, 96, 663-665, the disclosure of which in incorporated herein by reference in its entirety). The Pd metal can be replaced by Ni, but the cationic Ni complexes are less productive than the Pd catalysts by several orders of magnitude (See, "Catalyst composition and process for the preparation of copolymers of carbon monoxide and an olefinically unsaturated compound," Drent, E.; De Kock, M. C. T. U.S. Pat. No. 5,688,909, 1997, the disclosure of which in incorporated herein by reference in its entirety).

Both the 4-coordinate and 5-coordinate Ni complexes, which are in equilibrium under a CO atmosphere as shown in Scheme 1 below, can be the active species for the CO-olefin copolymerization (See, Cationic four- and five-coordinate CO-insertion mechanisms in $d^8$-nickel(II) complexes, Shultz, C. S.; DeSimone, J. M.; Brookhart, M. *J. Am. Chem. Soc.* 2001, 127, 9172-9173, the disclosure of which is incorporated herein by reference in its entirety).

Scheme 1

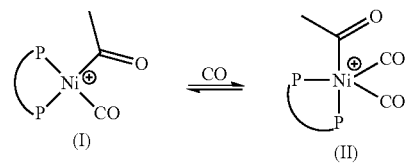

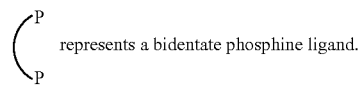

Beneficial use of these polymers, however, has been limited by the narrow temperature window between the melting temperature of polyketones and the temperatures at which they degrade, particularly for copolymers of CO and ethylene. Although pure polyketones degrade at greater than 350° C., it has been found that residuals of the polymerization catalyst will lower the product's degradation temperature. Depending on the amount of catalyst residue remaining in the product, the polyketone will exhibit a degradation temperature close enough to its melt temperature such that the operational range in which the polymer may be processed becomes severely limited.

As shown in FIG. 1, the thermogravimetric analysis of a polyketone formed from carbon monoxide and ethylene reveals a decomposition occurring at about 250° C. caused by catalyst residues, prior to the inherent decomposition at about 360° C. The decomposition is also manifested in differential scanning calorimetry study as shown in FIG. 2. In the first heating cycle, the melting temperature of the polyketone is 254° C. In the second heating cycle, two melting temperatures are observed at 237 and 245° C. below the initial melting temperature, indicating decomposition of the polymer. Discoloration and decomposition involved with processing metal catalyzed polyketones at temperatures marginally higher than its reported melt temperature of 257° C. has been noted in the art. It is also reported that a sufficiently high catalyst productivity and hence low level of contamination by catalyst residues is necessary to render the product processable in the art. Past attempts to lower the melt temperature have involved adding α-olefins as a means to incorporate various side chains. The CO-olefin copolymerization in the commercial processes is usually catalyzed by a Pd not Ni catalyst possibly for the reason of the low productivity of the Ni catalysts. It should be noted that Pd is much more expensive than Ni.

Carbon monoxide has also been shown to copolymerize with epoxides to produce polyesters. See, e.g., Liu, G.; Jia, L. J., *Am. Chem. Soc.* 2004, 126, 14716-14717, the disclosure of which is incorporated herein by reference in its entirety. Polyesters are known to be hydrolytically degradable in the earth environments and hence are desirable as environmentally friendly plastics. The polymerization is catalyzed by a neutral cobalt catalyst of the structure shown below.

(III)

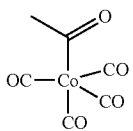

Charge neutrality of the cobalt catalyst is a critical feature because it allows the intermediate A to be an ion pair, which insures nucleophilic addition of the anionic cobaltate $Co(CO)_4^-$ to the acyloxonium ion as shown in the Scheme 2 below.

Scheme 2

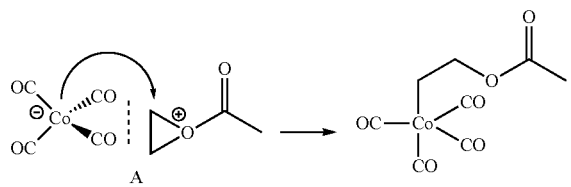

However, the polymerization rate and productivity for these polyesters is so much slower than CO-olefin copolymerization as to be impractical to use in any commercial processes.

Accordingly, what is needed in the art is a composition having beneficial hydrolytic degradability of the polyesters described above, but can be produced efficiently both in terms of the rate and productivity. More specifically, what is needed in the art is a composition having the beneficial properties of the polyketones described above, but is melt processable and can be formed at a commercially reasonable rate.

SUMMARY OF THE INVENTION

In one or more embodiments, the present invention is directed to a method and novel catalyst for polymerization of CO, an epoxide, and an olefin in a single reaction and the terpolymer formed thereby. Because of the inclusion of three types of monomers, we will refer to the polymerization as terpolymerization and the resulting polymer as a terpolymer. The resultant polymer chains are comprised of ketone repeat units, ester repeat units, and ether repeat units. The ketone unit is formed by sequential enchainment of CO and olefin. The ester repeat unit is formed by sequential enchainment of CO and epoxide. The ether repeat unit is formed by repetitive enchainment of epoxide but not by sequential enchainment of olefin and epoxide. The additional presence of the ester repeat units and ether repeat units have the effect of lowering terpolymer melt temperature relative to that of polyketone, thus separating the melt temperature from the decomposition temperature, making it suitable for melt processing. In a single reaction mixture, the same metal catalyst that polymerizes CO with olefins also incorporates epoxide monomers into the terpolymer in the form of ester or ester and ether linkages. As a part of the terpolymer chain, the ester groups can undergo hydrolysis, which renders the product hydrolytically degradable.

In a first aspect, the present invention is directed to a terpolymer composition comprising the residue of carbon monoxide, the residue of an olefin, and the residue of an epoxide, formed as the reaction product of these three monomers. In one or more embodiment, the terpolymer composition has a ketone repeating unit and an ester repeating unit. In one or more embodiment, the terpolymer composition has a ketone repeating unit, an ester repeating unit, and an ether repeating unit.

In one or more embodiments, the terpolymer composition of the present invention includes any one or more of the above referenced embodiments of the first aspect of the present invention wherein said olefin is ethylene. In one or more embodiments, the terpolymer composition of the present invention includes any one or more of the above referenced embodiments of the first aspect of the present invention wherein said epoxide is ethylene oxide.

In one or more embodiments, the terpolymer composition of the present invention includes any one or more of the above referenced embodiments of the first aspect of the present invention wherein said carbon monoxide (CO) residue comprises from about 30 to about 50 weight percent of said terpolymer composition. In one or more embodiments, the terpolymer composition of the present invention includes any one or more of the above referenced embodiments of the first aspect of the present invention wherein said olefin residue comprises from about 30 to about 70 weight percent of said terpolymer composition. In one or more embodiments, the terpolymer composition of the present invention includes any one or more of the above referenced embodiments of the first aspect of the present invention wherein said epoxide residue comprises from about 30 to about 50 weight percent of said terpolymer composition In one or more embodiments, the terpolymer composition of the present invention includes any one or more of the above referenced embodiments of the first aspect of the present invention having a weight average molecular weight of from about 5,000 g/mol to about 500,000 g/mol. In one or more embodiments, the terpolymer composition of the present invention includes any one or more of the above referenced embodiments of the first aspect of the present invention having a melting temperature ($T_m$) that is from about 1° C. to about 200° C. below its degradation temperature ($T_d$).

In a second aspect, the present invention is directed to a catalyst for making the terpolymer composition described above having the structure:

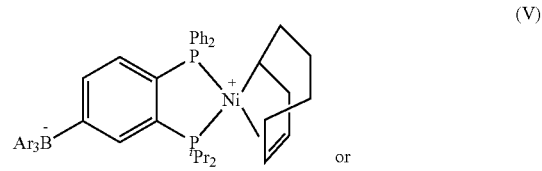

(V)

or

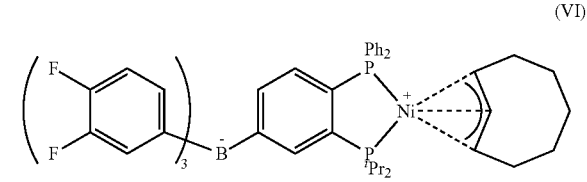

(VI)

where Ar is 3,4-difluorophenyl and $^i$Pr is an isopropyl group. In some other embodiments, In a third aspect, the present invention is directed to a method for making the terpolymer compositions described above comprising: dissolving Ni(COD)$_2$ and a bidentate ligand having the structure:

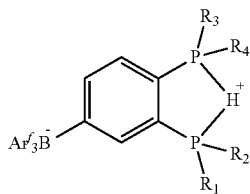

(IV)

where R$_1$, R$_2$, R$_3$, and R$_4$ are independently an alkyl, aryl, alkoxy, or amide group and Ar$^f$ is a fluorinated phenyl, in a suitable solvent under an inert and dry atmosphere; placing the solution in a hermetically sealed reaction vessel; dissolving ethylene oxide in a suitable solvent and adding it to said hermetically sealed reaction vessel; adding carbon monoxide (CO) gas and ethylene gas to said hermetically sealed reaction vessel and allowing the temperature of said hermetically sealed reaction vessel to increase to room temperature; and stirring the contents of said hermetically sealed reaction vessel to produce a terpolymer composition comprising the residues of the carbon monoxide, the ethylene, and the ethylene oxide. In one or more embodiments, the fluorinated phenyl on the bidentate ligand (Ar$^f$) is 3,4-difluorophenyl. In one or more embodiments, the method for making the terpolymer composition of the present invention includes any one or more of the above referenced embodiments of the third aspect of the present invention wherein R$_1$ and R$_2$ on molecule IV above are phenyl groups and R$_3$ and R$_4$ on molecule IV above are isopropyl groups.

BRIEF DESCRIPTION OF THE DRAWINGS

For a more complete understanding of the features and advantages of the present invention, reference is now made to the detailed description of the invention along with the accompanying figures in which.

DETAILED DESCRIPTION OF THE ILLUSTRATIVE EMBODIMENTS

Figure 1:
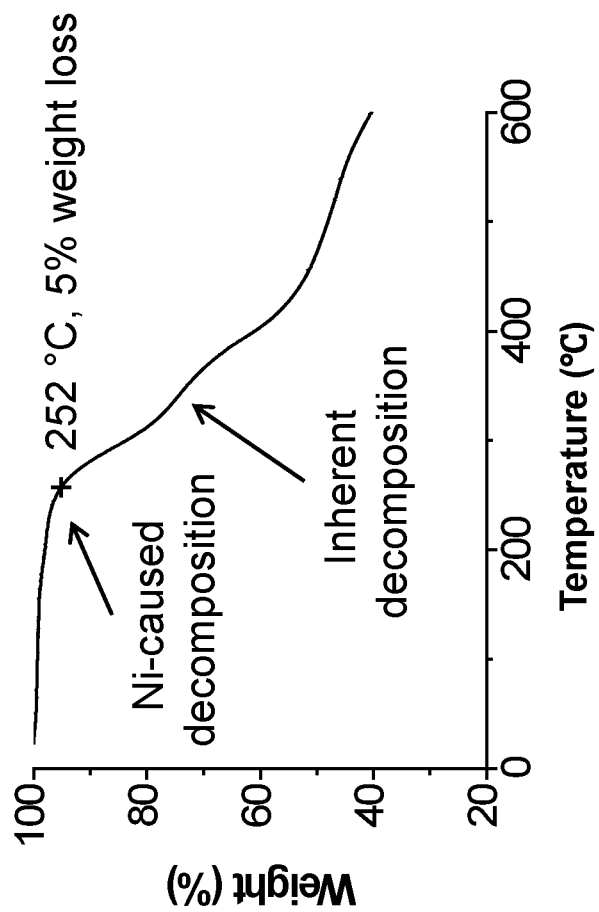
FIG. 1 is a graph showing the results of a thermogravimetric analysis of a polyketone showing a 2-step decomposition.
Figure 2:
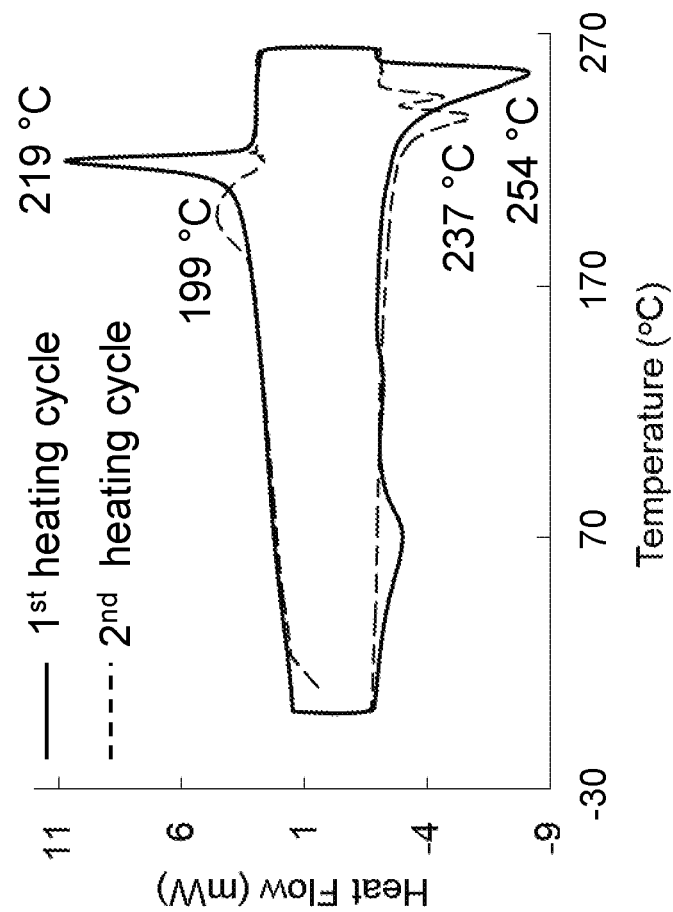
FIG. 2 is a graph showing the results of a differential scanning calorimetric analysis (DSC) of a polyketone formed from CO and ethylene showing signs of decomposition after one heating cycle.

As set forth above, in various embodiments, the present invention is directed to terpolymers of carbon monoxide (CO), olefins (alkenes), and epoxides and related methods and catalysts for their making and use. These terpolymer chains are comprised of ketone repeat units, ester repeat units, and ether repeat units. As set forth above, the additional presence of the ester repeat units and ether repeat units have the effect of lowering terpolymer melt temperature relative to that of polyketone, thus separating melt temperature from decomposition temperature, making it suitable for melt processing. In a single reaction mixture, the same metal catalyst that polymerizes CO with olefins also incorporates epoxide monomers into the terpolymer in the form of ester or ester and ether linkages. As a part of the terpolymer chain, the ester groups can undergo hydrolysis, which renders the product hydrolytically degradable.

In a first aspect, the present invention is directed to a polymer composition formed by the terpolymerization of CO, one or more olefin compound and one or more epoxide compound, and comprising the residues of these materials. As used herein, the term "residue" refers generally to the part of a monomer or other chemical unit that has been incorporated into a polymer or large molecule.

In one or more embodiment, the terpolymer of the present invention may contain the residue of one or more of the following olefins: ethylene, an alpha-olefin (for example, propylene), styrene or a combination thereof. In one or more embodiments, the terpolymer of the present invention may contain the residue of an olefin having the following formula:

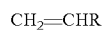
CH$_2$=CHR where R is an H atom, alkyl group, or aryl group. In one or more embodiments, the terpolymer of the present invention may contain the residue of ethylene.

In one or more embodiment, the terpolymer of the present invention may contain the residue of one or more epoxide including, without limitation, ethylene oxide, propylene oxide, and styrene oxide. In one or more embodiments, the terpolymer of the present invention may contain the residue of an epoxide having the following formula:

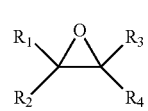

(VII)

where R$_1$, R$_2$, R$_3$ and R$_4$ are each individually a H atom, an alkyl group, or an aryl group. In one or more embodiments, the terpolymer of the present invention may contain the residue of ethylene oxide.

In one or more embodiments, the terpolymer of the present invention may contain from about 30 wt % to about 50 wt % epoxide residues. In some embodiments, the terpolymer of the present invention may contain from about 30 wt % to about 45 wt %, in other embodiments, from about 30 wt % to about 40 wt %, in other embodiments, from about 35 wt % to about 50 wt %, in other embodiments, from about 40 wt % to about 50 wt %, and in other embodiments, from about 35 wt % to about 45 wt % epoxide residues. Here, as well as elsewhere in the specification and claims, individual range values can be combined to form additional non-disclosed ranges.

In one or more embodiments, the terpolymer of the present invention may contain from about 30 wt % to about 50 wt % carbon monoxide residues. In some embodiments, the terpolymer of the present invention may contain from about 30 wt % to about 45 wt %, in other embodiments, from about 30 wt % to about 40 wt %, in other embodiments, from about 35 wt % to about 50 wt %, in other embodiments, from about 40 wt % to about 50 wt %, and in other embodiments, from about 35 wt % to about 45 wt % carbon monoxide residues. Here, as well as elsewhere in the specification and claims, individual range values can be combined to form additional non-disclosed ranges.

In one or more embodiments, the terpolymer of the present invention may contain from about 30 wt % to about 70 wt % olefin residues. In some embodiments, the terpolymer of the present invention may contain from about 30 wt % to about 65 wt %, in other embodiments, from about 30 wt % to about 60 wt %, in other embodiments, from about 30 wt % to about 50 wt %, in other embodiments, from about 35 wt % to about 60 wt %, and in other embodiments, from about 40 wt % to about 60 wt % olefin residues. Here, as well as elsewhere in the specification and claims, individual range values can be combined to form additional non-disclosed ranges.

In one or more embodiments, the terpolymer of the present invention may have the following formula:

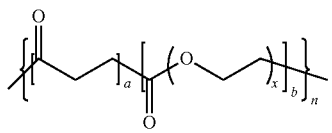
(VIII)

wherein a and b are mole fractions where a<1, b<1, and a+b=1; x in an integer from about 1 to about 20; and n is an integer from about 50 to about 10,000.

In some embodiments, a may be 0.60 or more, in other embodiments, 0.70 or more, in other embodiments, 0.80 or more, in other embodiments, 0.90 or more, and in other embodiments, 0.95 or more. In some embodiments, a may be 0.97 or less, in other embodiments, 0.95 or less, in other embodiments, 0.9 or less, in other embodiments, 0.8 or less, and in other embodiments, 0.7 or less. Similarly, in some embodiments, b may be 0.6 or more, in other embodiments, 0.70 or more, in other embodiments, 0.80 or more, in other embodiments, 0.90 or more, and in other embodiments, 0.95 or more. In some embodiments, b may be 0.97 or less, in other embodiments, 0.95 or less, in other embodiments, 0.9 or less, in other embodiments, 0.8 or less, and in other embodiments, 0.7 or less. Here, as well as elsewhere in the specification and claims, individual range values can be combined to form additional non-disclosed ranges.

In some embodiments, x may be 1 or more, in other embodiments, 2 or more, in other embodiments, 3 or more, in other embodiments, 4 or more, in other embodiments, 5 or more, and in other embodiments, 6 or more. In some embodiments, x may be 18 or less, in other embodiments, 16 or less, in other embodiments, 14 or less, in other embodiments, 12 or less, in other embodiments, 10 or less, and in other embodiments, 8 or less. As will be appreciated, when x=1, the terpolymer will contain only ketone repeat units and ester repeat units. And when x>1, the terpolymer will contain ketone repeat units, ester repeat units, and ether repeat units. Here, as well as elsewhere in the specification and claims, individual range values can be combined to form additional non-disclosed ranges.

In some embodiments, n may be 90 or more, in other embodiments, 200 or more, in other embodiments, 500 or more, in other embodiments, 1,000 or more, in other embodiments, 2,000 or more, and in other embodiments, 3,000 or more. In some embodiments, n may be 9,000 or less, in other embodiments, 16 or less, in other embodiments, 8,000 or less, in other embodiments, 7,000 or less, in other embodiments, 6,000 or less, and in other embodiments, 5,000 or less. Here, as well as elsewhere in the specification and claims, individual range values can be combined to form additional non-disclosed ranges.

Further, as will be appreciated by those of skill in the art, when the CO reacts with the olefin during polymerization, the resulting residue will have a ketone repeating unit formed by sequential enchainment of CO and olefin. Similarly, when the CO reacts with the epoxide during polymerization, the resulting residues will contain an ester repeating group formed by sequential enchainment of CO and epoxide. When an epoxide reacts following the reaction of CO with another epoxide during the polymerization, the resulting residues will contain an ether repeating unit. Put another way, the ether repeat unit is formed by repetitive enchainment of epoxide but not by sequential enchainment of olefin and epoxide. In some embodiments, the terpolymer of the present invention may be comprised of ketone and ester repeat units. In some other embodiments, the terpolymer of the present invention may be comprised of ketone, ester, and ether repeat units.

In one or more embodiments, the terpolymer of the present invention may have one of the following formulas:

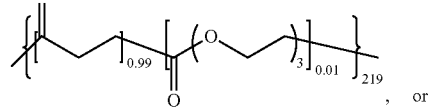
(IX)

, or

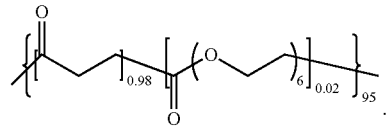
(X)

In one or more embodiments, the terpolymer of the present invention may have a weight-average molecular weight as measured by GPC of from about 5,000 g/mol to about 500,000 g/mol. In some embodiments, the terpolymer of the present invention may have a weight-average molecular weight of 10,000 g/mol or more, in other embodiments, 20,000 g/mol or more, in other embodiments, 50,000 g/mol or more, in other embodiments, 100,000 g/mol or more, in other embodiments, 200,000 g/mol or more, and in other embodiments, 300,000 g/mol or more. In some embodiments, the terpolymer of the present invention may have a weight-average molecular weight of 400,000 g/mol or less, in other embodiments, 300,000 g/mol or less, in other embodiments, 200,000 g/mol or less, in other embodiments, 150,000 g/mol or less, 100,000 g/mol or less, and in other embodiments, 75,000 g/mol or less. Here, as well as elsewhere in the specification and claims, individual range values can be combined to form additional non-disclosed ranges.

In one or more embodiments, the terpolymer of the present invention may have a polydispersity index of from about 1.5 to about 5. In some embodiments, the terpolymer of the present invention may have polydispersity index of from about 1.6 or more, in other embodiments, 1.7 or more, in other embodiments, 1.8. or more, in other embodiments, 2.0 or more, and in other embodiments, 2.0 or more. In some embodiments, the terpolymer of the present invention may have polydispersity index of from about 4 or less, in other embodiments, 3.5 or less, in other embodiments, 3.0 or less, in other embodiments, 2.5 or less, and in other embodiments, 2.0 or less. Here, as well as elsewhere in the specification and claims, individual range values can be combined to form additional non-disclosed ranges.

In one or more embodiments, the terpolymer of the present invention may have a melting temperature ($T_m$) of from about 100° C. to about 250° C. as measured by DSC. In some embodiments, the terpolymer of the present invention may have a $T_m$ of from about 120° C. or more, in other embodiments, 140° C. or more, in other embodiments, 160° C. or more, in other embodiments, 180° C. or more, in other embodiments, 200° C. or more, and in other embodiments, 220° C. or more. In some embodiments, the terpolymer of the present invention may have a $T_m$ of from about 230° C. or less, in other embodiments, 210° C. or less, in other embodiments, 190° C. or less, in other embodiments, 170° C. or less, in other embodiments, 150° C. or less, and in other embodiments, 130° C. or less. Here, as well as elsewhere in the specification and claims, individual range values can be combined to form additional non-disclosed ranges.

In one or more embodiments, the terpolymer of the present invention may have a degradation temperature ($T_d$) of from about 150° C. to about 400° C. as measured by DSC. In some embodiments, the terpolymer of the present invention may have a $T_d$ of from about 180° C. or more, in other embodiments, 210° C. or more, in other embodiments, 240° C. or more, in other embodiments, 270° C. or more, in other embodiments, 300° C. or more, and in other embodiments, 330° C. or more. In some embodiments, the terpolymer of the present invention may have a $T_d$ of from about 380° C. or less, in other embodiments, 350° C. or less, in other embodiments, 320° C. or less, in other embodiments, 290° C. or less, in other embodiments, 260° C. or less, and in other embodiments, 230° C. or less. Here, as well as elsewhere in the specification and claims, individual range values can be combined to form additional non-disclosed ranges.

In one or more embodiment, the same metal catalyst that polymerizes the CO with the olefins also incorporates the epoxide monomers into the terpolymer in the form of ester or ester and ether linkages, all in a single reaction mixture. As set forth above, the additional presence of the ester repeat units and ether repeat units in the terpolymers of various embodiments of the present invention have the effect of lowering terpolymer melt temperature relative to that of the corresponding polyketone, thus separating the melt temperature from the decomposition temperature and making the polymer suitable for melt processing. As used herein, the term "corresponding polyketone" refers to the polyketone made by polymerizing the CO with the same olefin, but without the epoxide.

In one or more embodiments, the terpolymer of the present invention may have a melting temperature ($T_m$) of from about 1° C. to about 100° C. less than its degradation temperature ($T_d$). In some embodiments, the terpolymer of the present invention may have a $T_m$ that is less than its degradation temperature ($T_d$) by 3° C. or more, in other embodiments, by 6° C. or more, in other embodiments, by 10° C. or more, in other embodiments, by 15° C. or more, in other embodiments, by 25° C. or more, in other embodiments, by 40° C. or more. In some embodiments, the terpolymer of the present invention may have a $T_m$ that is less than its degradation temperature ($T_d$) by 90° C. or less, in other embodiments, by 80° C. or less, in other embodiments, by 70° C. or less, in other embodiments, by 60° C. or less, in other embodiments, by 50° C. or less, and in other embodiments, by 40° C. or less. Here, as well as elsewhere in the specification and claims, individual range values can be combined to form additional non-disclosed ranges.

In a second aspect, the present invention is directed to a novel zwitterionic nickel catalyst for making the terpolymers described above. In one or more embodiments, the novel zwitterionic nickel catalyst of the present invention may be generated in situ, preferably from bis(1,5-cyclooctadiene)nickel(0) (Ni(COD)$_2$), and a zwitterionic diphosphine. In some other embodiments, the catalyst may be formed and isolated prior to polymerization. In one or more embodiments, the zwitterionic nickel catalyst has the structure:

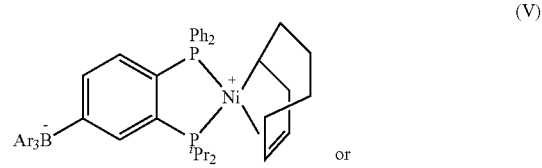

or

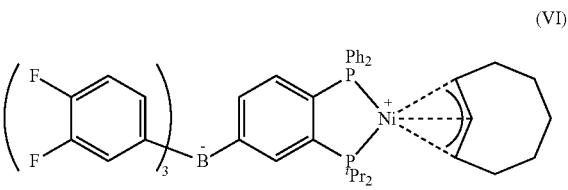

where Ar is 3,4-difluorophenyl, Ph is phenyl, and $^i$Pr is an isopropyl group.

This new catalyst that captures the critical features of both the cationic nickel catalyst (see, e.g., molecule I, above) for CO-olefin copolymerization and the neutral cobalt catalyst (see, e.g., molecule III, above) for CO-epoxide copolymerization, allowing it to catalyze the polymerization of all three types of comonomers, CO, olefin, and epoxide. Specifically, by being zwitterionic, this catalyst is overall charge-neutral like the cobalt catalyst but by keeping a cationic charge at the Ni center, retains the reactivity of the cationic Ni catalysts. In previously reported catalysts of similar structure (see, e.g., "Zwitterionic Nickel(II) Catalyst for CO-Ethylene Alternating Copolymerization", Jia, X.; Zhang, M. Pan, F.; Babahan, I.; Ding, K.; Jia, L.; Crandall, L. A.; Ziegler C. J. Organometallics 2015, 34, 4798-4801, the disclosure of which is incorporated herein by reference in its entirety), Ar is a phenyl group instead of 3,4-difluorophenyl. This catalyst was found to lack the necessary stability to catalyze polymerization involving epoxides, but is active for CO-ethylene copolymerization. Upon replacement of phenyl with 3,4-difluropheny, the stability of the catalyst improved permitting the unprecedented terpolymerization of CO, ethylene, and ethylene oxide.

The synthetic route for the zwitterionic nickel catalyst (V) of various embodiments of the present invention is outlined in Scheme 3 below:

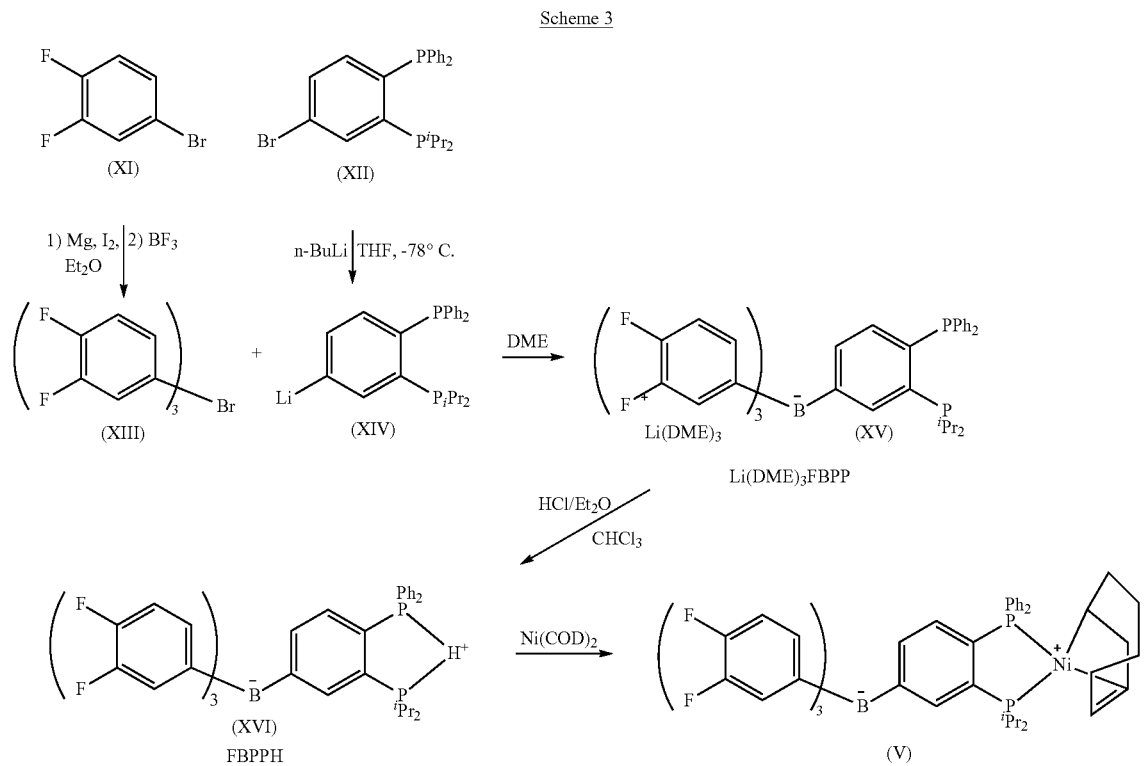

Scheme 3

As can be seen from Scheme 3, the process for making the nickel catalyst of the present invention begins with 4-Bromo-1,2-difluorobenzene (XI) and 4-bromo-2-(diisopropylphosphino)-1-diphenylphosphino-benzene (XII). The 4-Bromo-1,2-difluorobenzene (XI) is dissolved in a suitable solvent, such as diethyl ether, and reacted first with magnesium turnings and $I_2$ and then with $BF_3$ at a temperature of from about 25° C. to about 40° C. to form tris(3,4-difluorophenyl)borane (XIII). One of ordinary skill in the art will be able to find a suitable solvent without undue experimentation. Suitable solvents may include, without limitation, diethyl ether.

The starting diphosphine, 4-bromo-2-(diisopropylphosphino)-1-diphenylphosphino-benzene (XII), may be synthesized using the procedure shown in Jia, X.; Zhang, M. Pan, F.; Babahan, I.; Ding, K.; Jia, L.; Crandall, L. A.; Ziegler C. J., "Zwitterionic Nickel(II) Catalyst for CO-Ethylene Alternating Copolymerization", *Organometallics* 2015, 34, 4798-4801, the disclosure of which is incorporated herein by reference in its entirety). In one or more of these embodiments, the starting diphosphine (XII) may be dissolved in a suitable solvent, such as tetrahydrofuran (THF), and then cooled to a temperature of from about −20° C. to about −78° C. Next, the starting diphosphine (XII) is slowly reacted with n-BuLi dissolved in a suitable solvent, such as hexane, to form 4-litho-2-(diisopropylphosphino)-1-diphenylphosphino-benzene (XIV).

In these embodiments, the 4-litho-2-(diisopropylphosphino)-1-diphenylphosphino-benzene (XIV) is then reacted with the tris(3,4-difluorophenyl)borane (XIII) to form the lithium salt of an anionic diphosphine (Li(DME)$_3^+$FBPP$^-$) (XV). In these embodiments, molecule XV was dissolved in a suitable solvent (chloroform) then protonated with a HCl/Et$_2$O solution to form FBPPH (XVI). Finally, FBPPH (XVI) is reacted with bis(1,5-cyclooctadiene)nickel(0) (Ni(COD)$_2$) to form the zwitterionic nickel catalyst (V) of the present invention.

In one or more embodiments, new zwitterionic catalyst of the present invention may be generated as shown in Examples 1-5, below.

In a third aspect, the present invention is directed to a novel method of making the terpolymers described above. As set forth above, in one or more embodiments, a nickel catalyst is generated preferably from bis(1,5-cyclooctadiene)nickel(0) (Ni(COD)$_2$), and a zwitterionic diphosphine such as those having the structure shown below:

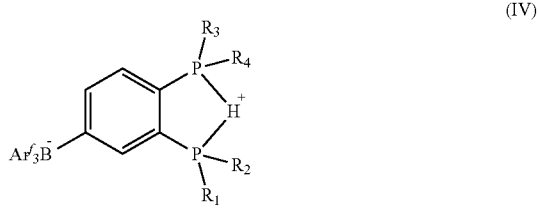

(IV)

where R1, R2, R3, and R4 are independently an alkyl, aryl, alkoxy, or amide; and Ar$^f$ is a fluorinated phenyl, in a suitable solvent under CO or an inert gas atmosphere. In one embodiment, R1 and R2 are phenyl groups, R3 and R4 are isopropyl, and Ar$^f$ is 3,4-difluorophenyl.

One of ordinary skill in the art will be able to select a suitable solvent and inert gas without undue experimentation. Suitable solvents may include, without limitation, toluene and suitable inert gasses may include, without limitation, nitrogen, argon, or combinations thereof. In one or more embodiments, Ni(COD)$_2$ and FBPPH are dissolved in toluene under a N$_2$ atmosphere.

The resulting solution is then placed in a temperature controlled, hermetically sealed reaction vessel, such as an autoclave, under an inert atmosphere. As should be apparent, the temperature controlled, hermetically sealed reaction vessel should have one or more inlet valves configured to allow the introduction of gasses and other reagents into the vessel without allowing gasses and/or reagents to leak out of the reaction vessel. The temperature of the reaction vessel is then kept at a temperature of from about 25° C. to about −78° C. In some embodiments, the temperature is reduced to from about 0° C. to about −78° C.

Then, one or more of the epoxides described above are dissolved in a suitable solvent, such as toluene, and introduced into the reaction vessel. In some embodiments, ethylene oxide is added to the reaction vessel at about −78° C. Next, CO and one of the olefins gasses described above are added to the reaction vessel under pressure. In one or more embodiment, CO gas is added and the reaction vessel pressurized to about 100-1000 psi and then the olefin is immediately added and the reaction vessel pressurized to about an additional 50-500 psi. The order in which the CO and Olefin gasses are added is not particularly limited provided that the second monomer is added immediately after the first monomer, so that there is little, if any time for the epoxide and the first monomer added to polymerize without the second monomer to be added being present. Accordingly, in one or more embodiment, the olefin gas is added and the reaction vessel pressurized to about 100-1000 psi and then the CO is immediately added and the reaction vessel pressurized to about an additional 50-500 psi. As set forth above, suitable olefins include ethylene, alpha-olefins such as propylene, and styrene.

The reaction vessel is then allowed to return to ambient temperature and stirred for from about 1 to about 16 hours. In one or more embodiment, the reaction mixture is stirred with a magnetic stir bar overnight. The pressure in the reaction vessel is then released and the solid terpolymer of the present invention collected and dried by conventional means. In some embodiments, methods for collecting the terpolymer from the reaction mixture may include, without limitation, filtration, vacuum filtration, and centrifugation. The solid terpolymer may be dried by any conventional means. In one or more embodiment, the solid terpolymer product may be dried under vacuum overnight.

EXAMPLES

The following examples are offered to more fully illustrate the invention, but are not to be construed as limiting the scope thereof. Further, while some of examples may include conclusions about the way the invention may function, the inventor do not intend to be bound by those conclusions, but put them forth only as possible explanations. Moreover, unless noted by use of past tense, presentation of an example does not imply that an experiment or procedure was, or was not, conducted, or that results were, or were not, actually obtained. Efforts have been made to ensure accuracy with respect to numbers used (e.g., amounts, temperature), but some experimental errors and deviations may be present. Unless indicated otherwise, parts are parts by weight, molecular weight is weight average molecular weight, temperature is in degrees Centigrade, and pressure is at or near atmospheric.

Example 1

Synthesis of tris(3,4-difluorophenyl)borane

Tris(3,4-difluorophenyl)borane was synthesized using the route shown in Scheme 4 below.

Scheme 4

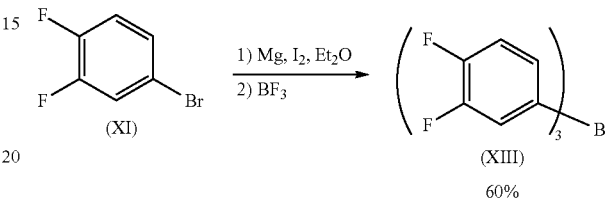

Magnesium turning (3.7 g, 156 mmol) and I$_2$ (50 mg) were added to a dry three-necked bottle. 4-Bromo-1,2-difluorobenzene (XI) (11.7 mL, 104 mmol) was dissolved in Et$_2$O (80 mL) and 10 mL solution was added to the three-necked bottle. After initiating the reaction by warm the bottle, the 4-bromo-1,2-difluorobenzene solution was added dropwise for 1 h. The reaction was allowed to warm to 40° C. and stirred for 1 h. BF$_3$ (4.6 mL, 46.7% in Et$_2$O, 34.5 mmol) was added to the reaction via a syringe at −78° C. The reaction was allowed to warm to room temperature overnight. The solvent was removed under vacuum to give brown crude product. White solid (7.2 g, 60% yield) was obtained by sublimation of the crude tris(3,4-difluorophenyl)borane product (XIII). $^1$H NMR (CDCl$_3$, 300 MHz): δ 7.36-7.33 (m, 2H), 7.29-7.26 (m, 6H), 7.24-7.21 (m, 1H) ppm, $^{13}$C{$^1$H} NMR (CDCl$_3$, 125 MHz): δ 153.3 (dd, J=267.8, 12.6 Hz), 150.2 (dd, J=249.3, 12.0 Hz), 135.3 (dd, J=7.0, 3.4 Hz), 126.7 (d, J=10.0 Hz), 126.6 (d, J=2.0 Hz), 117.2 (d, J=16.8 Hz) ppm, $^{19}$F{$^1$H} NMR (CDCl$_3$, 282 MHz): −131.4-131.5 (m), −138.1-138.2 (m) ppm. IR (neat): 2981, 2884, 1603, 1508, 1270, 1166, 1043, 758 cm-1. HRMS (MALDI) m/z: Calcd. For C$_{18}$H$_9$F$_6$$^{10}$B: 349.0738 (M)$^+$, Found: 349.0742.

Example 2

Synthesis of lithium salt of anionic diphosphine (Li(DME)$_3$$^+$FBPP$^-$)

The lithium salt of anionic diphosphine (Li(DME)$_3$$^+$FBPP$^-$) (XV) was synthesized from 4-bromo-2-(diisopropylphosphino)-1-diphenylphosphino-benzene (XII) using the route shown in Scheme 5 below.

Scheme 5

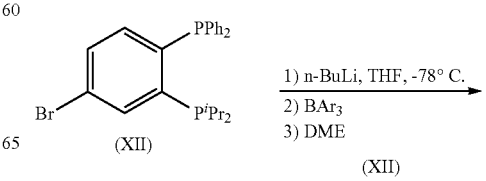

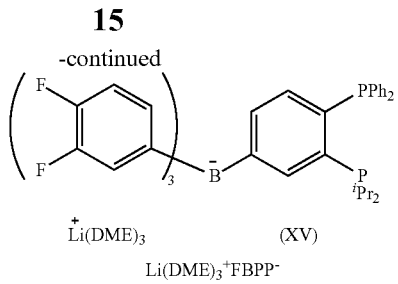

Li(DME)₃⁺FBPP⁻ (XV)

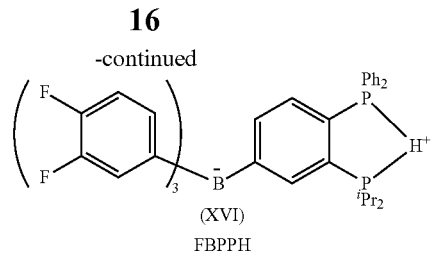

(XVI)
FBPPH

The starting diphosphine, 4-bromo-2-(diisopropylphosphino)-1-diphenylphosphino-benzene (XII), was synthesized following a published procedure ("Zwitterionic Nickel (II) Catalyst for CO-Ethylene Alternating Copolymerization", Jia, X.; Zhang, M. Pan, F.; Babahan, I.; Ding, K.; Jia, L.; Crandall, L. A.; Ziegler C. J. *Organometallics* 2015, 34, 4798-4801). The start diphosphine (XII) (0.92 g, 2.0 mmol) was dissolved in THF (20 mL) and cooled to −78° C. n-BuLi (0.8 mL, 2.5 M in hexane, 2.0 mmol) was added via a syringe. After 1 hour, solid tris(3,4-difluorophenyl)borane (XIII) (0.7 g, 2.0 mmol) was added into the above solution. The reaction was allowed to warm to room temperature overnight. The solvent was removed to leave a pinkish foamy semisolid. DME (5 mL) was added to dissolve the foamy semisolid. After removing the DME, Et₂O (5 mL) was added to dissolve the solid. The solution was allowed to sit at −45° C. for 3 days to give a crystalline white solid. The product (XV) was collected after filtration (1.6 g, 83% yield). ¹H NMR (CDCl₃, 500 MHz): δ 7.52-7.51 (m, 1H), 7.27-7.24 (m, 10H), 7.14-7.13 (m, 1H), 7.05-6.99 (m, 6H), 6.91-6.87 (m, 3H), 6.71-6.68 (m, 1H), 3.52 (s, 12H), 3.36 (s, 18H), 1.95-1.92 (m, 2H), 1.07 (d, J=7.0 Hz, 3H), 1.04 (d, J=7.5 Hz, 3H), 0.76 (d, J=7.5 Hz, 3H), 0.74 (d, J=7.0 Hz, 3H) ppm. ¹³C{¹H} NMR (CDCl₃, 125 MHz): δ 161.5 (dd, J=98.4, 48.4 Hz), 159.7 (dd, J=98.1, 49.8 Hz), 151.1, 148.1, 147.7 (d, J=12.0 Hz), 145.8 (d, J=12.1 Hz), 141.2, 139.5 (dd, J=14.3, 6.4 Hz), 137.7 (d, J=31.8 Hz), 135.7, 134.0 (d, J=18.1 Hz), 130.9, 127.8 (d, J=6.5 Hz), 127.5, 122.7 (d, J=11.6 Hz), 114.0 (d, J=3.8 Hz), 70.6, 59.2, 24.5 (d, J=4.5 Hz), 24.4 (d, J=4.4 Hz), 20.2, 20.1, 19.4, 19.3 ppm. ³¹P{¹H} NMR (202 MHz, CDCl₃): −2.1 (d, J=159.4 Hz), −13.5 (d, J=159.4 Hz) ppm. ¹⁹F{¹H} NMR (CDCl₃, 470 MHz): −144.7-144.8 (m), −149.2-149.3 (m) ppm. IR (neat): 2952, 2881, 1605, 1495, 1386, 1263, 1090, 757 cm⁻¹. HRMS (MALDI) m/z: Calcd. For C₄₂H₃₆¹⁰BF₆P₂: 726.2320 [M-Li(DME)₃]⁺, Found: 726.2322. Anal. Calcd for C₅₄H₆₆BF₆LiO₆P₂: C, 64.55; H, 6.62. Found: C, 64.48; H, 6.37.

Example 3

Synthesis of Zwitterionic Diphosphine (FBPPH)

Zwitterionic diphosphine (FBPPH) (XVI) was synthesized from Li(DME)₃FBPP (XV) using the route shown in Scheme 6 below.

Scheme 6

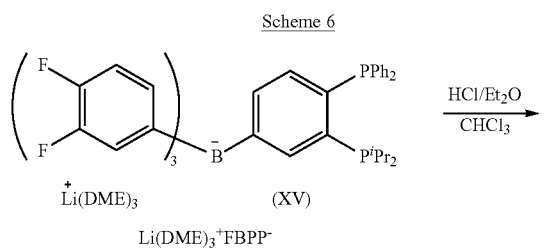

Li(DME)₃⁺FBPP⁻

Li(DME)₃⁺FBPP⁻ (XV) (2.0 g, 2.0 mmol) was dissolved in CHCl₃ (20 mL) and cooled to −78° C. HCl (2.0 mL, 1.0 M in Et₂O, 2.0 mmol) was added via a syringe. A white precipitate formed immediately. The reaction was allowed to warm to room temperature and stirred for 1 h. After removal of the precipitate by filtration through celite, the volume of the chloroform solution was reduced to 10 mL, and hexane (50 mL) was added to the solution to precipitate the FBPPH product (XVI). The product was isolated as a white solid after filtration (1.2 g, 85% yield). ¹H NMR (CDCl₃, 500 MHz): δ 7.78 (m, 1H), 7.49-7.39 (m, 7H), 7.28-7.24 (m, 4H), 7.12-7.11 (m, 1H), 6.98-7.90 (m, 9H), 6.47-6.46 (m, PP-H, 1H), 2.69-2.66 (m, 2H), 1.35 (d, J=6.5 Hz, 3H), 1.31 (d, J=7.5 Hz, 3H), 1.07 (d, J=7.5 Hz, 3H), 1.02 (d, J=7.0 Hz, 3H) ppm. ¹³C{¹H} NMR (CDCl₃, 125 MHz): δ 168.0 (d, J=99.5, 42.9 Hz), 157.2 (dd, J=100.8, 48.1 Hz), 150.4, 148.5, 148.2 (d, J=13.1 Hz), 146.3 (d, J=13.3 Hz), 142.5, 135.6 (d, J=11.3 Hz), 134.5 (d, J=9.8 Hz), 133.8 (d, J=13.1 Hz), 133.7 (d, J=17.9 Hz), 130.6, 129.8, 129.1 (d, J=6.9 Hz), 122.7 (d, J=12.3 Hz), 114.8 (dd, J=14.4, 4.3 Hz), 22.4 (d, J=4.3 Hz), 22.0 (d, J=4.0 Hz), 17.69, 17.68, 17.65, 16.7 ppm. ³¹P{¹H} NMR (202 MHz, CDCl₃): δ 26.7 (br, s), −14.6 (d, J=67.5 Hz). ¹⁹F{¹H} NMR (CDCl₃, 470 MHz): −142.8-142.9 (m), −147.3-147.4 (m) ppm. IR (neat): 3038, 2975, 2873, 1605, 1496, 1461, 1389, 1264, 1093, 757 cm⁻¹. HRMS (MALDI) m/z: Calcd. For C₄₂H₃₆¹⁰BF₆P₂: 726.2320 (M-H)⁻, Found: 726.2324. Anal. Calcd for C₄₂H₃₇BF₆P₂: C, 69.25; H, 5.12. Found: C, 69.58; H, 5.05.

Example 4

Generation of Zwitterionic Nickel Catalyst

The zwitterionic nickel catalyst (V) was generated from FBPPH (XVI) using the route shown in Scheme 7 below.

Scheme 7

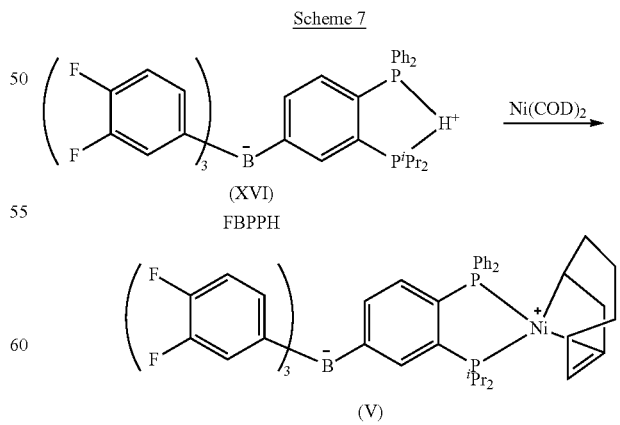

Bis(1,5-cyclooctadiene)nickel(0) (Ni(COD)₂) (0.0125 mmol, 3 mg) and the zwitterionic diphosphine abbreviated as FBPPH (XVI) (0.0187 mmol, 13 mg) were dissolved in 2 mL toluene under N$_2$. This gave a solution containing about 0.0125 mmol of the zwitterionic nickel catalyst (V).

Example 5

Synthesis and Isolation of Zwitterionic Nickel Catalyst

Alternatively, the zwitterionic nickel catalyst (VI) was isolated from reaction of FBPPH (XVI) using the route shown in Scheme 8 below.

Scheme 8

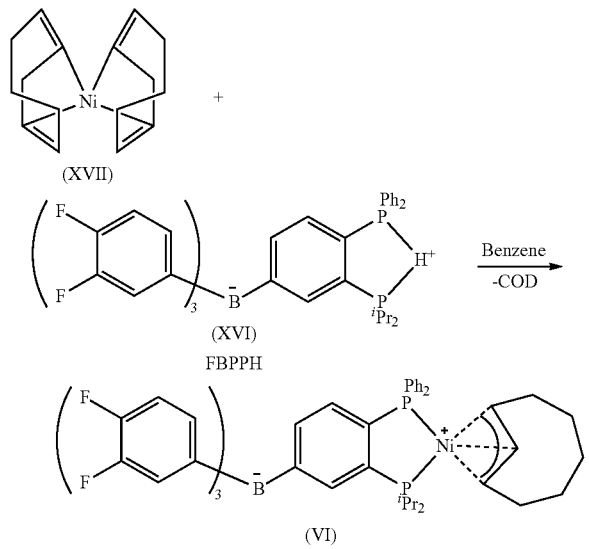

Ligand FBPPH (XVI) (218.4 mg, 0.3 mmol) was dissolved in toluene (5 mL) at room temperature, and Ni(COD)$_2$ (XVII) (82.5 mg, 0.3 mmol) was added to the toluene solution. The solution quickly turned to orange-red in a few minutes. Toluene was removed, and Et$_2$O (5 mL) was added to dissolve the residual solid. A yellow solid (185.1 mg, 69%) was crystallized from diethyl ether at −45° C. $^1$HNMR (THF-d$_8$, 500 MHz): δ 7.82-7.79 (m, 1H), 7.62-7.56 (m, 1H), 7.51-7.43 (m, 11H), 6.94-6.80 (m, 9H), 5.42-5.36 (m, 1H), 5.30-5.26 (m, 1H), 5.20-4.95 (m, 1H), 2.63-2.53 (m, 2H), 2.43-2.38 (m, 1H), 1.89-1.84 (m, 1H), 1.65-1.33 (m, 8H), 1.26-1.07 (m, 9H), 0.79-0.74 (m, 3H) ppm, $^{13}$C{$^1$H} NMR (THF-d$_8$, 125 MHz): δ 169.8 (dd, J=98.0, 49.4 Hz), 158.2 (dd, J=100.1, 50.9 Hz), 149.2 (d, J=245.1 Hz), 147.1 (dd, J=239.8, 13.0 Hz), 140.0 (d, J=43.6 Hz), 135.6 (dd, J=54.1, 37.8 Hz), 133.2 (d, J=12.9 Hz), 132.0 (dd, J=72.5, 47.3 Hz), 132.0 (dd, J=89.9, 47.4 Hz), 131.0 (dd, J=70.4, 2.9 Hz), 130.8, 129.0 (d, J=10.1 Hz), 128.9 (d, J=10.6 Hz), 122.6 (d, J=15.3 Hz), 114.1 (dd, J=14.5, 4.0 Hz), 112.1, 81.9 (d, J=15.3 Hz), 76.3 (d, J=18.0 Hz), 31.3 (d, J=2.1 Hz), 30.5, 28.4 (d, J=3.9 Hz), 27.4, 26.0, 25.9, 25.8, 25.7, 22.4, 19.4 (d, J=3.8 Hz), 18.3 (d, J=3.6 Hz), 17.6 (d, J=4.1 Hz), 16.4 (d, J=4.0 Hz) ppm, $^{31}$P{$^1$H} NMR (THF-d$_8$, 202 MHz): 75.6 (d, J=5.3 Hz), 52.8 (d, J=5.3 Hz) ppm. $^{19}$F{$^1$H} NMR (CDCl$_3$, 470 MHz): −144.6-144.7 (m), −149.3-149.4 (m). Anal. Calcd for C$_{50}$H$_{49}$BF$_6$NiP$_2$: C, 67.07; H, 5.52. Found: C, 67.33; H, 5.52.

Example 6

Synthesis of Terpolymer of CO, Ethylene, and Ethylene Oxide

Figure 3:
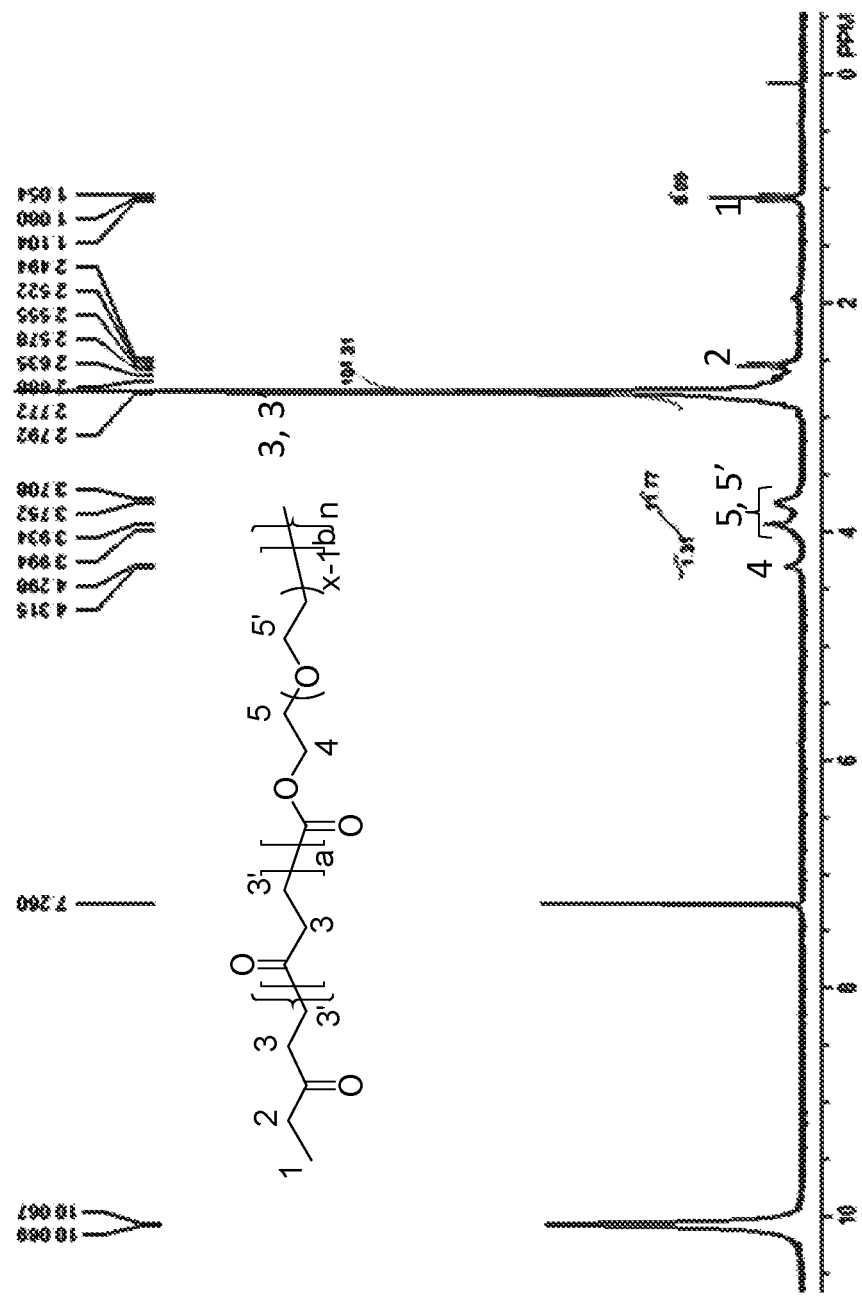
FIG. 3 is a $^1$H NMR spectrum of CO-ethylene-ethylene oxide terpolymer according to one or more embodiments of the present invention in CDCl$_3$/CF$_3$COOD, with peak assignments.

The catalyst solution generated according to Example 4 was added to an autoclave containing toluene (5 mL) at −78° C. under a N$_2$ atmosphere. (Alternatively, a catalyst solution containing 0.0125 mol of molecule (VI) in 2 mL toluene could also have been used). Ethylene oxide in toluene (V/V=1:1, 2 mL) was added to the autoclave at −78° C. The reactor was pressurized with 100 psi of CO and 300 psi of ethylene and allowed to warm to room temperature. The reaction mixture was stirred with a magnetic stir overnight. The pressure was released, and a white solid was obtained after filtration. The solid product was dried under vacuum overnight and weighed. The yield was 1.26 g. The $^1$H NMR spectrum of the product is shown below with the peak assignments (FIG. 3). As can be seen, the product is a terpolymer of CO, ethylene, and ethylene oxide, the composition of which is described by the following structure:

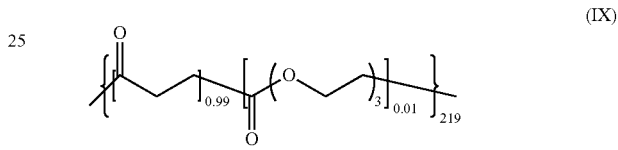

Figure 4:
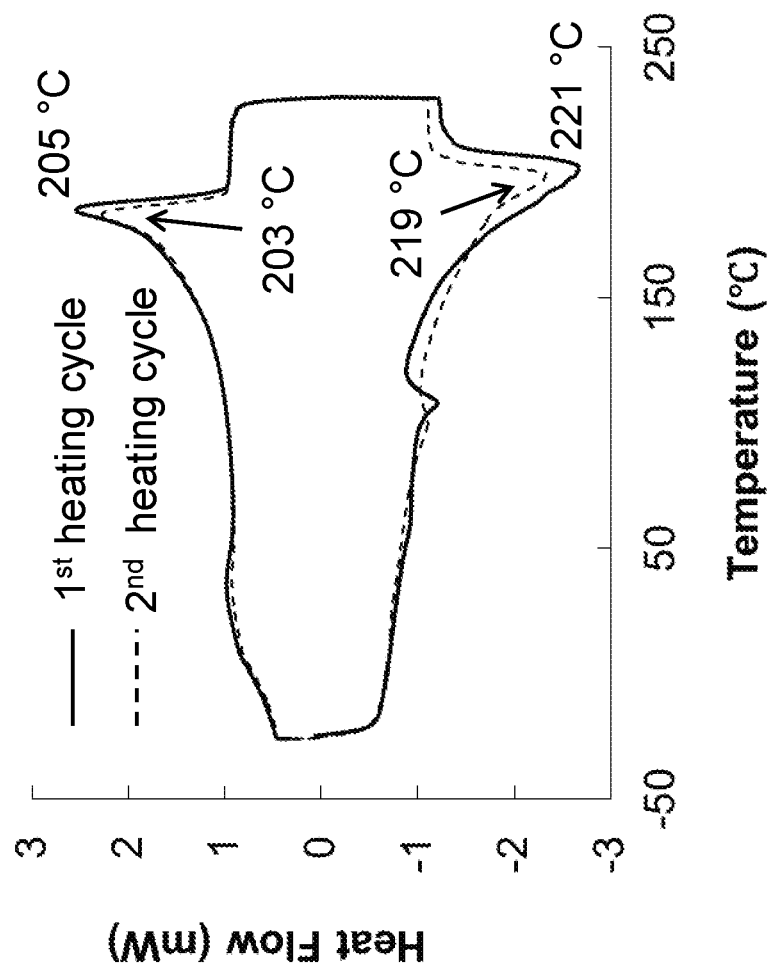
FIG. 4 is a graph showing the results of a differential scanning calorimetry (DSC) analysis of a terpolymer of CO, ethylene, and ethylene oxide according to one or more embodiments of the present invention.

The weight-average molecular weight of the terpolymer (IX) was 23,200 g/mol, and the polydispersity index was 1.9, as determined by GPC using hexafluoroisopropanol as the solvent and polymethyl mathacrylate as the standards. The DSC trace of the terpolymer is shown in FIG. 4. The melting temperature of the terpolymer (IX) is lowered compared to the CO-ethylene copolymer. The decrease in the melting temperature in the second heating cycle is minimal.

Example 7

The experiment was carried out in the same manner as in Example 6 except that the reactor was pressurized with 500 psi of CO and 300 psi of ethylene. The solid product was dried under vacuum overnight and weighed. The yield of the product (X) was 0.57 g. The product is a terpolymer of CO, ethylene, and ethylene oxide, the composition of which is described by the following structure:

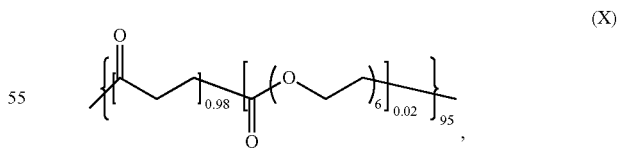

judging from the $^1$H NMR spectrum of the product. The weight-average molecular weight of the terpolymer (X) was 10,400 g/mol, and the polydispersity index was 1.8, as determined by GPC using hexafluoroisopropanol as the solvent and polymethyl methacrylate as the standards.

In light of the foregoing, it should be appreciated that the present invention significantly advances the art by providing a terpolymer of CO, an epoxide and an olefin that is a new matter that is structurally and functionally improved in a number of ways compared to related known matters such as polyketones from copolymerization of CO and ethylene and polyesters from copolymerization of CO and epoxide. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

What is claimed is:

1. A polymer composition having a polymer chain comprising the residue of carbon monoxide, the residue of an olefin, and the residue of an epoxide.

2. The polymer composition of claim 1 having a ketone repeating unit and an ester repeating unit.

3. The polymer composition of claim 1 having a ketone repeating unit, an ester repeating unit, and an ether repeating unit.

4. The polymer composition of claim 1, wherein said olefin is ethylene.

5. The polymer composition of claim 1, wherein said epoxide is ethylene oxide.

6. The polymer composition of claim 1, wherein said carbon monoxide (CO) residue comprises from about 30 to about 50 weight percent of said polymer composition.

7. The polymer composition of claim 1, wherein said olefin residue comprises from about 30 to about 70 weight percent of said polymer composition.

8. The polymer composition of claim 1 wherein said epoxide residue comprises from about 30 to about 50 weight percent of said polymer composition.

9. The polymer composition of claim 1, having a weight average molecular weight of from about 5,000 g/mol to about 500,000 g/mol.

10. The polymer composition of claim 1 having a melting temperature ($T_m$) that is from about 1° C. to about 100° C. below its degradation temperature ($T_d$).

11. The polymer composition of claim 1 having the formula:

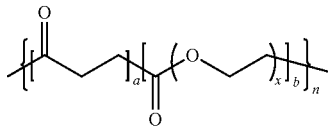

wherein a and b are mole fractions where a<1, b<1 and a+b=1; x in an integer from about 1 to about 20; and n is an integer from about 50 to about 10,000.

* * * * *